(12) United States Patent
Gottumukkala et al.

(10) Patent No.: US 11,418,503 B2
(45) Date of Patent: Aug. 16, 2022

(54) SENSOR-BASED AUTHENTICATION, NOTIFICATION, AND ASSISTANCE SYSTEMS

(71) Applicant: Bank of America Corporation, Charlotte, NC (US)

(72) Inventors: Kamesh R. Gottumukkala, Fremont, CA (US); Siten Sanghvi, Jersey City, NJ (US); Linda Haddad, San Francisco, CA (US); Jeff Lojko, Miami, FL (US)

(73) Assignee: Bank of America Corporation, Charlotte, NC (US)

( * ) Notice: Subject to any disclaimer, the term of this patent is extended or adjusted under 35 U.S.C. 154(b) by 440 days.

(21) Appl. No.: 16/503,114

(22) Filed: Jul. 3, 2019

(65) Prior Publication Data
US 2021/0006557 A1    Jan. 7, 2021

(51) Int. Cl.
*H04L 9/40* (2022.01)
*G06K 19/07* (2006.01)
*H04W 4/029* (2018.01)

(52) U.S. Cl.
CPC ...... *H04L 63/0861* (2013.01); *G06K 19/0718* (2013.01); *H04W 4/029* (2018.02)

(58) Field of Classification Search
CPC ............... G06K 19/0718; H04W 4/029; H04L 63/0861
See application file for complete search history.

(56) References Cited

U.S. PATENT DOCUMENTS

| 8,880,434 | B2* | 11/2014 | Bemmel | G06Q 20/20 |
| | | | | 705/67 |
| 9,788,211 | B2 | 10/2017 | Zhang | |
| 9,858,925 | B2 | 1/2018 | Gruber et al. | |
| 9,935,904 | B2 | 4/2018 | Sharma et al. | |
| 9,961,624 | B1 | 5/2018 | Zait | |
| 10,257,668 | B2 | 4/2019 | Shaw et al. | |
| 10,366,391 | B2* | 7/2019 | Dimmick | G06Q 20/326 |
| 10,733,607 | B2* | 8/2020 | Weiss | G06F 21/35 |
| 10,749,678 | B1* | 8/2020 | Kurian | H04L 9/3231 |
| 10,824,703 | B1* | 11/2020 | Desai | G06V 40/70 |
| 2002/0133467 | A1* | 9/2002 | Hobson | G06Q 20/04 |
| | | | | 705/64 |

(Continued)

OTHER PUBLICATIONS

The Future of Banking advertisement from <https://www.youtube.com/watch?v=_iTQVkJZUKU>, dated Dec. 31, 2015.

*Primary Examiner* — Daniel I Walsh
(74) *Attorney, Agent, or Firm* — Banner & Witcoff, Ltd.

(57) ABSTRACT

Aspects of the disclosure relate to notification, and assistance systems that may utilize sensor-based authentication techniques. A computing platform may receive user information corresponding to a first user. The user information may be authentication information from a sensor and/or a first communication device associated with the user. Based on the received user information, the computing platform may authenticate an identity of the first user and determine a location of the first user. Then, based on authenticating the identity and determining the location, the sensor may retrieve data corresponding to the first user and transmit the data to a second communication device.

17 Claims, 7 Drawing Sheets

(56) References Cited

U.S. PATENT DOCUMENTS

| | | | |
|---|---|---|---|
| 2011/0238510 A1* | 9/2011 | Rowen | G06V 40/382 |
| | | | 705/16 |
| 2016/0335532 A1 | 11/2016 | Sanghavi et al. | |
| 2016/0366128 A1* | 12/2016 | Dascola | H04L 63/0861 |
| 2020/0372142 A1* | 11/2020 | Huang | G06F 21/32 |
| 2021/0006557 A1* | 1/2021 | Gottumukkala | H04W 12/104 |
| 2021/0345954 A1* | 11/2021 | Shelton, IV | A61M 15/0066 |
| 2021/0365892 A1* | 11/2021 | Cunningham, Jr. | G06F 21/31 |
| 2022/0003676 A1* | 1/2022 | Mazed | H04W 4/33 |
| 2022/0109983 A1* | 4/2022 | Barkam | H04W 4/38 |

* cited by examiner

SENSOR-BASED AUTHENTICATION, NOTIFICATION, AND ASSISTANCE SYSTEMS

BACKGROUND

Enhanced connectivity between communication devices, possible with advancing communication protocols, may be leveraged for providing better quality of service by service providers. Sensors and/or data gathering systems may be interfaced with the communication devices for higher levels of automation. Newer cellular standards and technologies have made possible servicing an ever-increasing number of connected devices. This has opened up avenues for development of smart systems for improved services.

SUMMARY

Aspects of the disclosure provide effective, efficient, scalable, and convenient technical solutions that address and overcome technical problems associated with authenticating users and providing notifications using automated assistance systems. In particular, one or more aspects of the disclosure relate to sensor-based authentication and notification, integrated with faster communication technologies, for more efficient and error-free authentication of users and transmission of notification information.

In accordance with one or more arrangements, a computing platform having at least one processor, a communication interface, and memory may receive, via the communication interface, user information corresponding to a first user, wherein receiving the user information comprises receiving the user information, from at least one of one or more sensors and a first communication device associated with the first user, and wherein the user information comprises received authentication information corresponding to the first user and location information of the first user. The computing platform, based on the received user information, may authenticate an identity of the first user, wherein authenticating the identity of the first user comprises comparing the received authentication information with stored authentication information stored in an authentication database associated with the computing platform, and may determine, a location of the first user. Then, the computing platform may, based on authenticating the identity of the first user and determining the location of the first user, retrieve, from a user database, data corresponding to the first user. In addition, the computing platform may transmit, via the communication interface, a notification message to a second communication device, wherein the notification message: is transmitted to a second communication device that is associated with a second user and comprises the data corresponding to the first user as retrieved from the user database.

In some arrangements, the received authentication information comprises biometric identification information corresponding to the first user received from the one or more sensors, wherein the one or more sensors are located at the location.

In some arrangements, the received authentication information comprises biometric identification information corresponding to the first user received from the one or more sensors, wherein the one or more sensors are associated with the first communication device.

In some arrangements, the location information of the first user corresponds to a location of the first communication device associated with the first user.

In some arrangements, the computing platform may receive, via the communication interface and from a third communication device associated with the first user, source data. Thereafter, the computing platform may store the source data in the user database. Further, the computing platform may link the source data to the first user, wherein retrieving the data corresponding to the first user from the user database comprises retrieving the source data linked to the first user.

In some arrangements, the third communication device is the same as the first communication device.

In some arrangements, the source data corresponds to source data as input by the first user at a user interface corresponding to the third communication device.

In some arrangements, the computing platform may determine, based on the source data, assistance information, wherein the assistance information comprises information corresponding to the location. Then, the computing platform may transmit, via the communication interface, to the first communication device, the assistance information.

In some arrangements, the assistance information comprises information corresponding to the second user associated with the second communication device.

In some arrangements, receiving the source data may comprise parsing keywords from the source data.

In some arrangements, determining the assistance information may comprise determining the assistance information based on the parsed keywords.

In some arrangements, the user information may comprise information corresponding to the location as determined by the first communication device.

In some arrangements, the data corresponding to the first user further comprises data corresponding to a second user associated with the first user.

In some arrangements, the data corresponding to the first user further comprises data corresponding to historical activity at the first communication device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for interfacing automated user assistant systems at computer systems/communication devices with enterprise networks to provide improved quality of services. Some aspects of the disclosure use networked sensors and/or authentication systems at enterprise locations to facilitate, in conjunction with automated user assistant systems, faster and more efficient dissemination of information and services.

Introduction of 5G technologies is expected to significantly improve data throughput of wireless systems. One or more of computer systems, communication devices, user assistant systems, and networked sensors described herein may utilize 5G technologies for transmission and reception of data. The utilization of 5G technologies may ensure secure transmission of data from multiple devices (e.g., sensor devices, communication devices, etc.) with lower probability of network congestion.

Figure 1A:
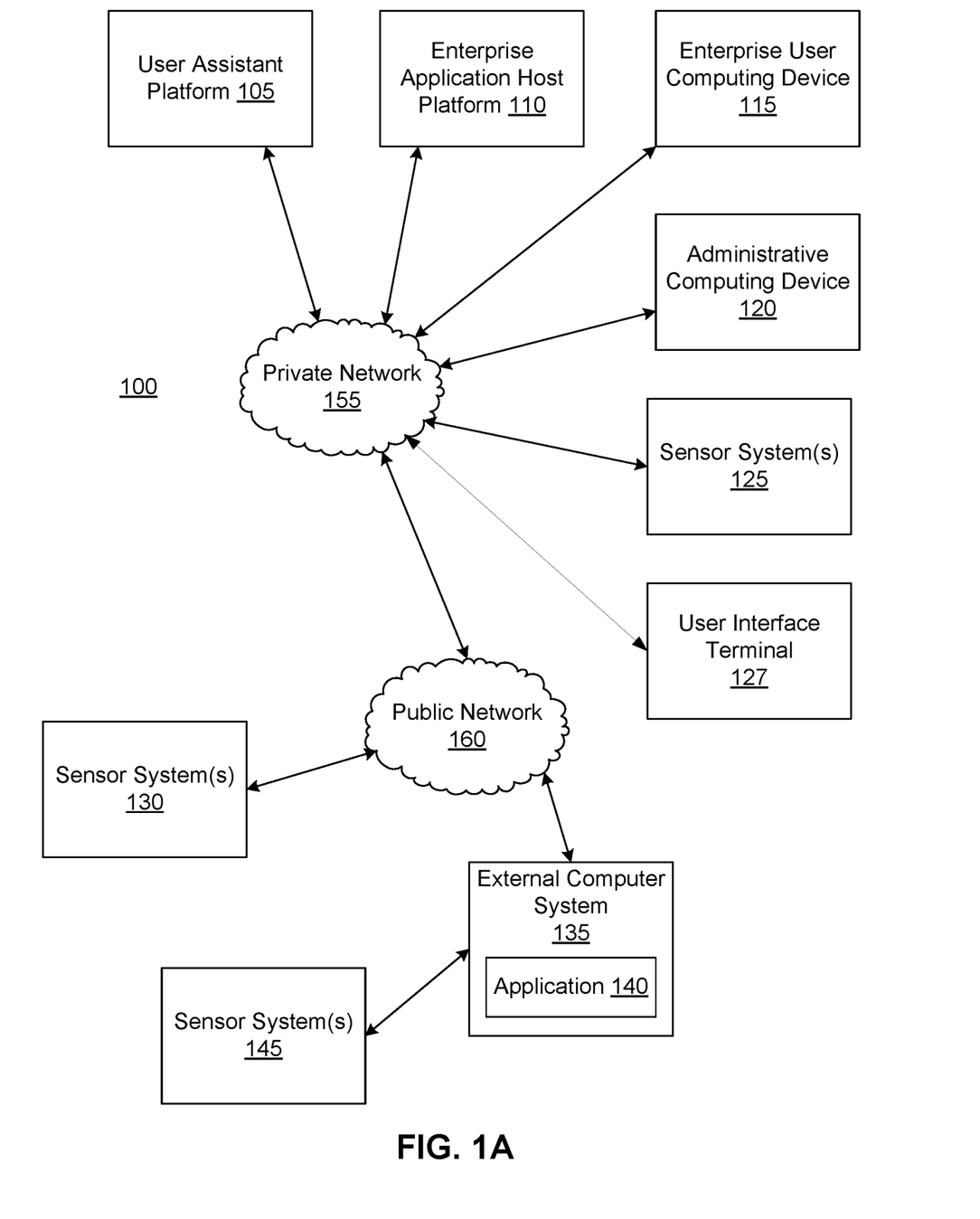
FIGS. 1A and 1B show an illustrative computing environment for sensor-based authentication, notification, and assistance systems, in accordance with one or more example embodiments.
Figure 1B:
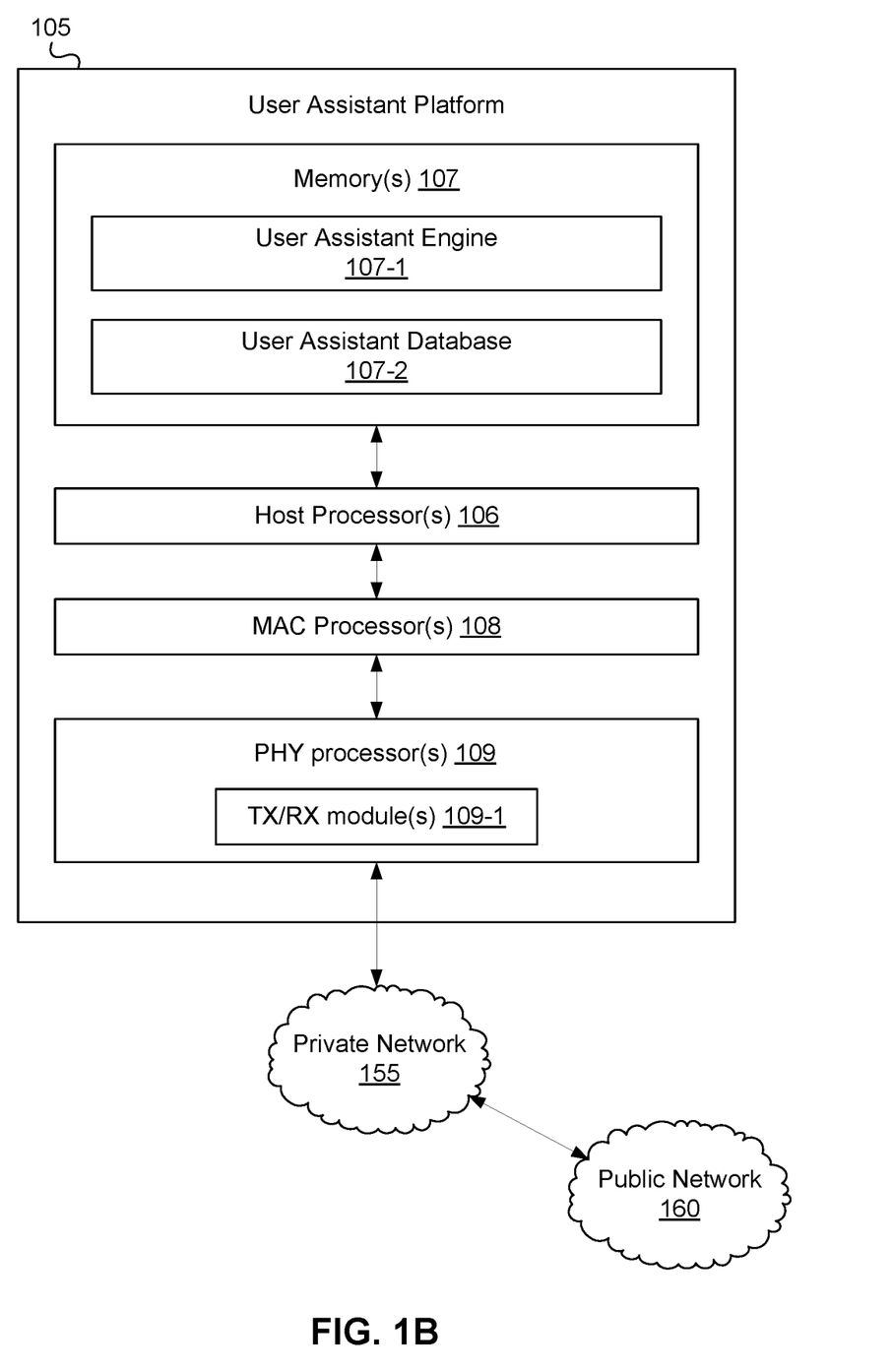

FIGS. 1A and 1B depict an illustrative computing environment for sensor-based authentication, notification, and assistance systems, in accordance with one or more example embodiments. Referring to FIG. 1A, a computing environment 100 may comprise one or more devices (e.g., computer systems, communication devices, user assistant systems, and/or networked sensors). For example, the computing environment 100 may comprise a user assistant platform 105, an enterprise application host platform 110, an enterprise user computing device 115, an administrative computing device 120, a user interface terminal 127, and/or sensor system(s) 125. The computing environment 100 may further comprise sensor system(s) 130, an external computer system 135, and/or sensor system(s) 145. The one or more devices and systems noted above may be linked over communication networks such as a private network 155 and a public network 160. The communication networks may use wired and/or wireless communication protocols.

A user in a context of the computing environment 100 may, for example, be an associated user (e.g., an external user, an employee, an affiliate, or the like) of an enterprise organization operating the user assistant platform 105. The external user may avail services being provided by the enterprise organization. Users may operate one or more elements in the computing environment to send messages to and/or receive messages from the user assistant platform 105. An enterprise organization may correspond to any government or private institution, an educational institution, a financial institution, health services provider, retailer, etc.

As illustrated in greater detail below, the user assistant platform 105 may comprise one or more computing devices configured to perform one or more of the functions described herein. For example, the user assistant platform 105 may comprise one or more computers (e.g., laptop computers, desktop computers, servers, server blades, or the like).

The enterprise application host platform 110 may comprise one or more computing devices and/or other computer components (e.g., processors, memories, communication interfaces). In addition, and as illustrated in greater detail below, the enterprise application host platform 110 may be configured to host, execute, and/or otherwise provide one or more enterprise applications. For example, the enterprise application host platform 110 may be configured to host, execute, and/or otherwise provide one or more transaction processing programs, loan application processing programs, user servicing programs, and/or other programs associated with an enterprise organization. In some instances, the enterprise application host platform 110 may be configured to provide various enterprise and/or back-office computing functions for an enterprise organization. For example, the enterprise application host platform 110 may comprise various servers and/or databases that store and/or otherwise maintain account information, such as financial/membership account information including account balances, transaction history, account owner information, and/or other information corresponding to one or more users (e.g., external users). In addition, the enterprise application host platform 110 may process and/or otherwise execute transactions on specific accounts based on commands and/or other information received from other computer systems comprising the computing environment 100. Additionally, or alternatively, the enterprise application host platform 110 may receive data from the user assistant platform 105, manipulate and/or otherwise process such data, and/or return processed data and/or other data to the user assistant platform 105 and/or to other computer systems in the computing environment 100.

The enterprise user computing device 115 may be a personal computing device (e.g., desktop computer, laptop computer) or mobile computing device (e.g., smartphone, tablet). In addition, the enterprise user computing device 115 may be linked to and/or operated by a specific enterprise user (who may, e.g., be an employee or other affiliate of an enterprise organization operating the user assistant platform 105). The administrative computing device 120 may be a personal computing device (e.g., desktop computer, laptop computer) or mobile computing device (e.g., smartphone, tablet). In addition, the administrative computing device 120 may be linked to and/or operated by an administrative user (who may, e.g., be a network administrator of an enterprise organization operating the user assistant platform 105).

The user interface terminal 127 may a computing terminal that is accessible by a user (e.g., an external user of an enterprise organization operating the user assistant platform 105). The computing terminal may be placed at a location of an enterprise organization (e.g., an office location, an outlet, service center, etc.) operating the user assistant platform 105. The computing terminal may be used by the user to input authentication information, corresponding to the user. The computing terminal may, for example include a user interface (e.g., a touch screen display) that may be used by the user to input authentication information, corresponding to the user.

The external computer system 135 may be a personal computing device (e.g., desktop computer, laptop computer) or mobile computing device (e.g., smartphone, tablet). The external computer system 135 may be linked to and/or operated by an external user of an enterprise organization operating the user assistant platform 105 and who may interact with one or more enterprise resources while using a device located outside of an enterprise firewall.

An application 140, may operate on the external computer system 135 and perform one or more functions corresponding to automated notification and assistance systems as described in this disclosure. The application 140 may correspond to an enterprise organization operating the user assistant platform 105. The application 140 may be, for example, a software application, such as an application(s) corresponding to a financial institution, a government or a private enterprise, a health institution, an educational institution, or the like, electronic mail application(s), messaging application(s), and the like. The application 140 may be an automated assistant application(s) at the external computer system 135. The automated assistant may, for example, enable a user operating the external computer system 135 to seek and/or receive information from one or more devices and/or users connected to/associated with a network in the computing environment 100, or to request certain services (e.g., membership services) from the enterprise organization. The application 140 may be a software application(s) running on an operating system of the external computer system 135, or may be built into the framework of the operating system itself. The external computer system 135 may be a personal computing device (e.g., desktop computer, laptop computer, or the like.) or mobile computing device (e.g., smartphone, tablet, or the like.).

The sensor system(s) 125, 130, and 145 may comprise sensor sensing systems and data processing systems. The sensor system(s) 125, 130, and 145 may be used to gather biometric data (e.g., voice data, fingerprint data, facial data, etc.) corresponding to a user of the computing platform 100 and process the data for transmission within the private network 155 and/or the public network 160. The sensor system(s) 125, 130, and/or 145 may comprise, for example, cameras, fingerprint scanners, microphones, etc. that may measure and/or record biometric data corresponding to a user. The sensor system(s) may further include processors, memories, TX/RX module(s), etc., to process and transmit sensor data to other devices within the computing environment 100.

The sensor system(s) 145 may be integrated and/or communicatively coupled with the external computer system 135. In an aspect, the sensors systems 145 may comprise iris scanners, facial scanners, fingerprint scanners, etc., that are integrated with the external computer system 135. The external computer system 135 may be communicatively coupled, for example, over International Institute of Electrical and Electronics Engineers (IEEE) Standard 802.15.1 ("Bluetooth"), IEEE Standard 802.11 ("Wi-Fi"), and/or near-field communication (NFC), or the like, links to the sensor system(s) 145. The sensor system(s) 145 may also be a personal wearable device, such as a smart watch or a fitness tracker.

The computing environment 100 may also comprise of one or more networks (e.g., public networks and/or private networks), which may interconnect one or more of the user assistant platform 105, the enterprise application host platform 110, the enterprise user computing device 115, the administrative computing device 120, the sensor system(s) 125, 130, and 145, and/or the external computer system 135. For example, the computing environment 100 may comprise the private network 155 (which may, e.g., interconnect the user assistant platform 105, the enterprise application host platform 110, the enterprise user computing device 115, the administrative computing device 120, the sensor system(s) 125, the user interface terminal 127, and/or one or more other systems which may be associated with an enterprise organization, such as a financial institution, a service provider, a government or a private enterprise, a health institution, an educational institution, or the like) and the public network 160 (which may, e.g., interconnect the sensor system(s) 130, the external computer system 135, and the sensor system(s) 145 with private network 155 and/or one or more other systems, public networks, sub-networks, and/or the like).

In one or more aspects, the user assistant platform 105, the enterprise application host platform 110, the enterprise user computing device 115, the administrative computing device 120, the external computer system 135, the user interface terminal 127, the sensor system(s) 125, 130, and/or 145, and/or other systems in the computing environment 100 may be any type of computing device capable of receiving input via a user interface, and communicating the received input to one or more other computing devices. For example, the user assistant platform 105, the enterprise application host platform 110, the enterprise user computing device 115, the administrative computing device 120, the external computer system 135, and/or the other systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. As noted above, and as illustrated in greater detail below, any and/or all of the user assistant platform 105, the enterprise application host platform 110, the enterprise user computing device 115, the administrative computing device 120, the user interface terminal 127, the external computer system 135, the sensor system(s) 125, 130, and 145, and/or other systems in the computing environment 100 may, in some instances, be special-purpose computing devices configured to perform specific functions.

Referring to FIG. 1B, the user assistant platform 105 may comprise of one or more of host processor(s) 106, memory 107, medium access control (MAC) processor(s) 108, physical layer (PHY) processor(s) 109, transmit/receive (TX/RX) module(s) 109-1, etc. One or more data buses may interconnect host processor(s) 106, memory 107, MAC processor(s) 108, PHY processor(s) 109, and/or Tx/Rx module(s) 109-1. The user assistant platform 105 may be implemented using one or more integrated circuits (ICs) configured to operate as discussed below. The host processor(s) 106, the MAC processor(s) 108, and the PHY processor(s) 109 may be implemented, at least partially, on a single IC or multiple ICs. Memory 107 may be any memory such as a random access memory (RAM), a read-only memory (ROM), a flash memory, or any other electronically readable memory, etc.

In various examples described below, messages transmitted from and received at devices in the computing environment 100 may be encoded in one or more MAC data units and/or PHY data units. In various embodiments, the MAC processor(s) 108 and/or the PHY processor(s) 109 of the user assistant platform 105 are configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the TX/RX module(s) 109-1 to the private network 155 and/or the public network 160. Similarly, the PHY processor(s) 109 may receive PHY data units from the TX/RX module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

In an embodiment, one or more processors (e.g., the host processor(s) 106, the MAC processor(s) 108, the PHY processor(s) 109, and/or the like) of the user assistant platform 105 are configured to execute machine readable instructions stored in memory 107. Memory 107 may comprise (i) one or more program modules/engines having instructions that when executed by the one or more processors cause the user assistant platform 105 to perform one or more functions described herein and/or (ii) one or more databases that may store and/or otherwise maintain information which may be used by the one or more program modules/engines and/or the one or more processors. In some instances, the one or more program modules/engines and/or databases may be stored by and/or maintained in different memory units of the user assistant platform 105 and/or by different computing devices that may form and/or otherwise make up the user assistant platform 105. For example, memory 107 may have, store, and/or comprise a user assistant engine 107-1, and a user assistant database 107-2. User assistant engine 107-1 may have instructions that direct and/or cause the user assistant platform 105 to perform one or more operations, as discussed in greater detail below. User assistant database 107-2 may store user information corresponding to users operating within the computing environment 100. User assistant database 107-2 may, for example, store information corresponding to one or more messages as received from external computer system 135. Information stored in the user assistant database 107-2 may be utilized by host processor(s) 106, MAC processor(s) 108, and PHY processor(s) 109 to transmit notifications to one or more users operating within computing environment 100, as discussed in greater detail below.

One or more of the MAC processor(s) 108, the PHY processor(s) 109, and/or the TX/RX modules(s) 109-1 may implement 5G communication standards. The memory 107 may store machine readable instructions that, when executed by the one or more of the MAC processor(s) 108, the PHY processor(s) 109, and/or the TX/RX modules(s) 109-1 enable generation, transmission, reception, and/or processing of one or more data units that conform to the 5G communication standards. One or more of the host processor(s) 106, the MAC processor(s) 108, and the PHY processor(s) 109 may use hardware and/or software that implements the 5G communication standards. For example, the MAC processor(s) 108 may generate MPDUs and the PHY processor(s) 109 may generate PPDUs that conform to the 5G communication standards, which may be then transmitted by the TX/RX module(s) 109-1 over a 5G wireless communication channel.

While FIG. 1A illustrates the user assistant platform 105 as being separate from other elements connected in private network 155, in one or more other arrangements, the user assistant platform 105 may be included in one or more of the enterprise application host platform 110, the enterprise user computing device 115, and the administrative computing device 120. In an example, elements in the user assistant platform (e.g., host processor(s) 105, memory(s) 107, MAC processor(s) 108, PHY processor(s) 109, and TX/RX module(s) 111, one or more program modules and/or stored in memory(s) 107) may share hardware and software elements with and corresponding to one or more of the enterprise application host platform 110, the enterprise user computing device 115, and/or the administrative computing device 120.

Figure 2A:
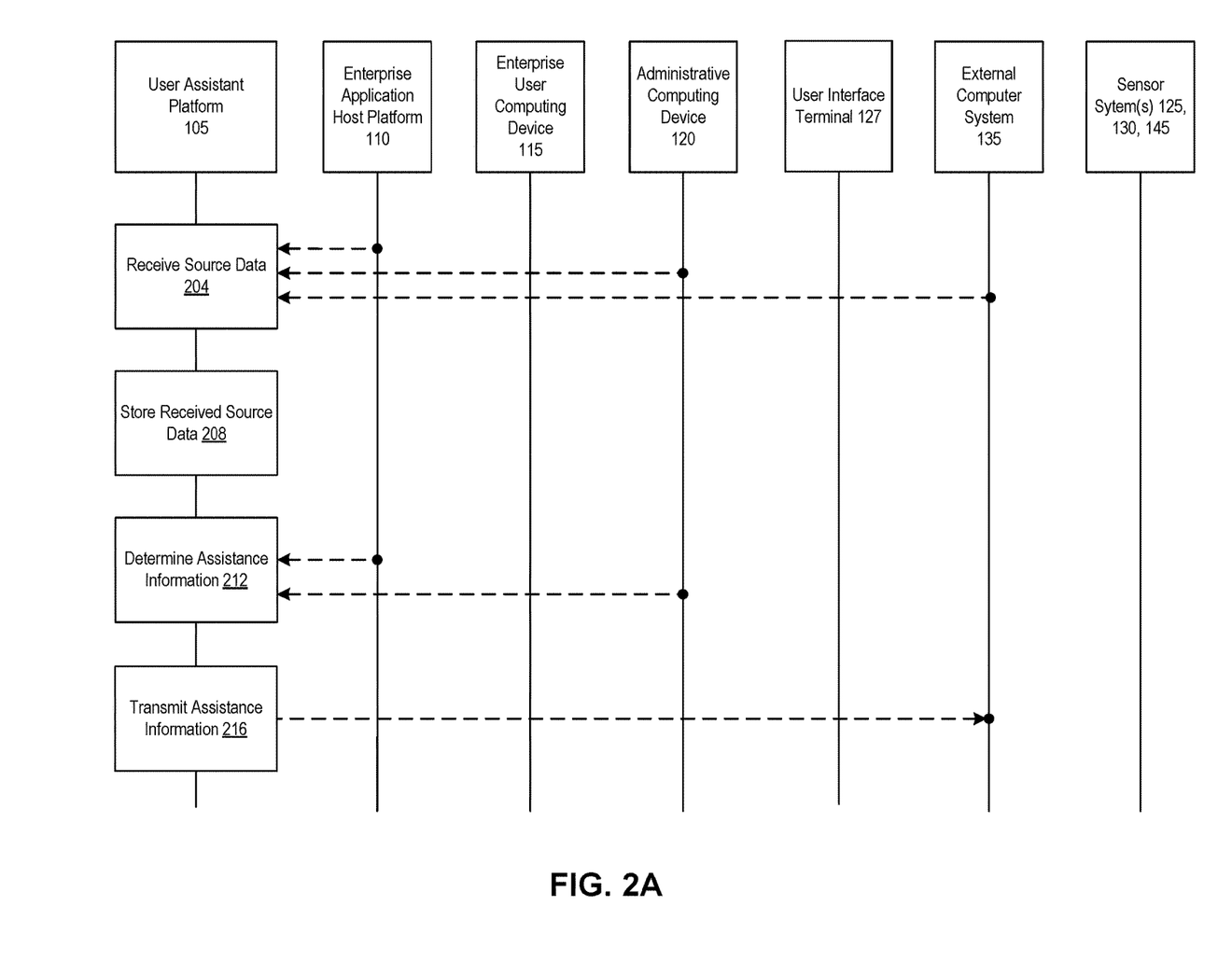
FIGS. 2A and 2B show an illustrative event sequence for sensor-based authentication, notification, and assistant systems, in accordance with one or more example embodiments.
Figure 2B:
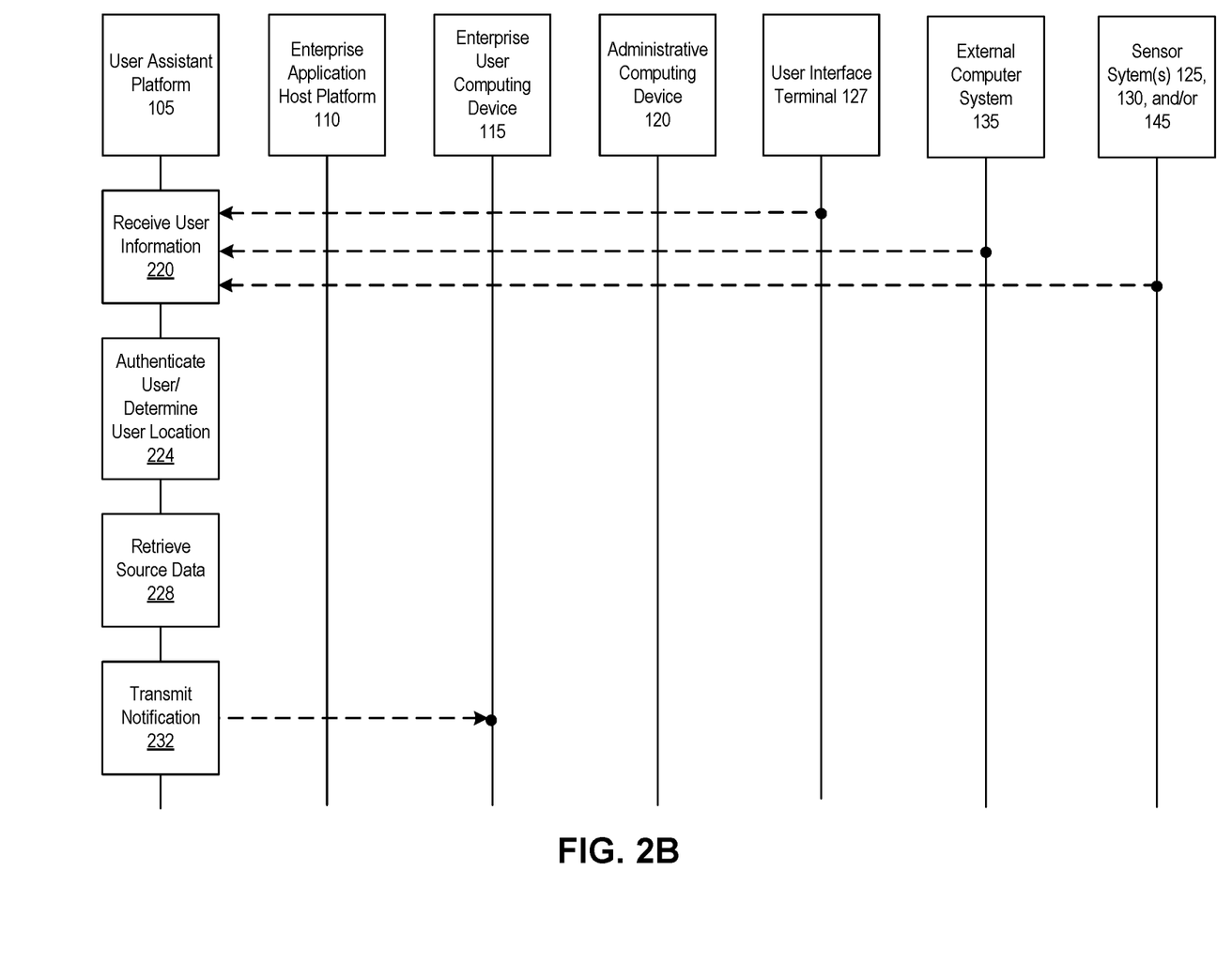

FIGS. 2A and 2B depict an illustrative event sequence for sensor-based authentication, notification, and assistant systems, in accordance with one or more example embodiments. The illustrative event sequence is described with reference to the computing environment 100 merely as an example. In other embodiments, the illustrative event sequence occurs in a computing environment different from the computing environment 100.

Referring to FIG. 2A, at step 204, the user assistant platform 105 may receive source data from one or more of the enterprise application host platform 110, the administrative computing device 120, the external computer system 135, and/or the like. The received source data may, for example, correspond to information that has been fed into the external computer system 135 (e.g., through the application 140) by a user (e.g., an external user) of an enterprise organization operating the user assistant platform 105. The information may, for example, correspond to/comprise a request for information and/or a request for a service from the enterprise organization operating the user assistant platform 105. The request for information and/or the request for the service may, for example, correspond to a user profile, associated with the user, at the enterprise organization (e.g., as stored in one or more databases in devices connected to the private network 155). The information may further comprise a location (e.g., postal address, ZIP code, global navigation satellite system (GNSS) coordinates, and the like) of the user. The location may be determined, for example, by a GNSS module in the external computer system. The location may be estimated based on an IP address corresponding to the external computer system 135. The location may be determined based on a user input at an interface at the external computer system 135.

The received source data may further comprise other information associated with the user as stored in one or more databases in devices connected in the private network 155 (e.g., the enterprise application host platform 110, the administrative computing device 120, etc.). The other information as stored in the one or more databases may comprise historical account information associated with the user, prior information as received from the external computer system 135 (e.g., previously received source data), biographical data associated with the user, information corresponding to services being provided to the user, and/or other information associated with the user.

At step 208, the user assistant platform 105 may store the received source data as received in step 204. The received source data may be stored, for example, in the user assistant database 107-2 at the user assistant platform 105. The received source data may be linked to the user and stored in a first look-up table in the user assistant database 107-2.

At step 212, the user assistant platform 105 may determine assistance information, for example, based on the received source data as received at step 204 and stored at step 208. The assistance information may comprise one or more of, for example, a location of the enterprise organization operating the user assistant platform 105 (e.g., an office location, a branch location, an outlet location, etc.), information corresponding to an employee of the enterprise organization (e.g., identification, employee designation, etc., to which the user has been assigned for assistance), and/or additional information requested from the user, etc. The assistance information may further comprise, for example, a computing device (e.g., the enterprise user communication device 115) corresponding to an employee of the enterprise organization to which the user has been assigned. The assistance information may further comprise a time/date when assistance would be available to the user at the location of the enterprise organization. The assistance information may be determined based on times/dates when the location of the enterprise organization is least busy.

In an example, keywords may be identified in the received source data, and based on the identified keywords, assistance information may be determined. The user assistant platform 105 may store keywords and corresponding assistance information in a second look-up table (e.g., in the user assistant database 107-2 or in any other database associated with one or more devices in the computing environment 100). The user assistant platform 105 may, based on the identified keywords in the received source data, retrieve corresponding assistance information from the second look-up table.

At step 216, the user assistant platform 105 may transmit the assistance information (e.g., as determined in step 212) to the external computer system 135 corresponding to the user. The assistance information may be displayed/indicated in the external computer system 135, or a display linked to the external computer system 135. The assistance information may be displayed/indicated, for example, in the application 140 associated with the external computer system 135.

With reference to FIG. 2B, at step 220, the user assistant platform 105 may receive user information corresponding to the user. Receiving the user information may comprise receiving location information and/or authentication information from one or more of the sensor system(s) 125, 130, and/or 145. The sensor system(s) 125, 130, and/or 145 may, for example, be biometric sensor system(s) (e.g., a fingerprint sensor system, a facial recognition system, a voice recognition system, etc.). The user information may be determined by sensor system(s) (e.g., the sensor system(s) 125) present at the location of the enterprise organization. The sensor system(s) may receive and process biometric data received at the sensor system(s) 125, 130, and/or 145, and transmit the processed data to the user assistant platform 105.

The location information may comprise a location of the external computer system 135 corresponding to the user. The location information may be determined, for example, based on a GNSS module in the external computer system 135. The location information may be determined, for example, based on cell tower triangulation technology (or other mobile phone tracking methods). The location information may be determined based on wireless connections (e.g., 802.11 connections) maintained by the external computer system 135.

Receiving the user information may comprise receiving location information and/or authentication information from a computing device/communication device placed at a location of the enterprise organization. The user may input the confirmation of the user's availability and/or presence at the location of the enterprise organization at the user interface terminal 127 (e.g., a touch screen display) present at the location of the enterprise organization. Receiving user information may, for example, comprise receiving an indication of an availability and/or presence of the user at a location of the enterprise organization. The user information may comprise the indication of the availability and/or presence of the user at the location of the enterprise organization, for example, if the user inputs a confirmation of the user's availability and/or presence at the location of the enterprise organization.

Receiving user information may comprise receiving location information and/or authentication information from the external computer system 135 corresponding to the user. The user may input the confirmation of the user's availability and/or presence at the location of the enterprise organization at the external computer system 135 corresponding to the user. The user may, for example, input the confirmation using the application 140 on the external computer system 135.

At step 224, the user assistant platform 105 may authenticate an identity and/or determine a location of the user, for example, based on the received user information. The user assistant platform may, for example, authenticate an identity of the user and/or further determine that the location of the user corresponds to the location of the enterprise organization operating the user assistant platform 105. The location of the enterprise organization may correspond to information as included in the assistance information (e.g., as determined at step 212 and transmitted at step 216).

The user assistant platform 105 may, for example, compare the received authentication information (e.g., biometric data as received at step 220) to authentication data stored in one or more databases corresponding to the enterprise organization to determine and authenticate the user. Authenticating the user and/or determining a location of the user may comprise authenticating the identity of the user, for example, by comparing received fingerprint data (e.g., from the sensor system(s) 125, 130, and/or 145) with fingerprint data, corresponding to the user, stored at the user assistant database 107-2 and/or one or more databases in the enterprise application host platform 110. Authenticating the user and/or determining a location of the user may comprise authenticating the identity of the user, for example, by comparing received facial imaging data (e.g., from the sensor system(s) 125, 130, and/or 145) with facial imaging data, corresponding to the user, stored at the user assistant database 107-2 and/or one or more databases in the enterprise application host platform 110. Authenticating the user and/or determining a location of the user may comprise authenticating the identity of the user, for example, by comparing received voice data (e.g., from the sensor system(s) 125, 130, and/or 145) with voice data, corresponding to the user, stored at the user assistant database 107-2 and/or one or more databases in the enterprise application host platform 110. Authenticating the user and/or determining a location of the user may comprise receiving the authentication information from the sensor 125, placed at the location of the enterprise organization, and comparing the received authentication information with the stored authentication information.

Authentication information may comprise data different from biometric data. The user assistant platform 105 may authenticate the user and/or determine a location of the user based on a token-based identification. The user assistant platform may transmit a token to external computer system 135 which may then be manually entered at the user interface terminal 127 (e.g., a touch screen display) present at the location of the enterprise organization. Alternatively, or additionally, the user assistant platform 105 may authenticate the user and/or determine a location of the user based on a manual entry of authentication information (e.g., an account number, a ZIP code of a residential address of the user), by the user, at the user interface terminal 127 present at the location of the enterprise organization.

The user assistant platform 105 may authenticate the user and/or determine that the location of the user corresponds to the location of the enterprise organization if the user assistant platform 105 receives an indication of an availability and/or presence of the user at the location of the enterprise organization. The user assistant platform 105 may authenticate the user and/or determine that the location of the user corresponds to the location of the enterprise organization, for example, if the user inputs a confirmation of the user's availability and/or presence at the location of the enterprise organization. The user may input the confirmation at the user interface terminal 127 (e.g., a touch screen display) present at the location of the enterprise organization. The user may input the confirmation at a user interface associated with the external computer system 135 (e.g., using the application 140).

The user assistant platform 105 may authenticate the user and/or a determine that the location of the user corresponds to the location of the enterprise organization based on receiving a user location corresponding to the user and determining that the location of the user corresponds to the location of the enterprise organization. The user location may be determined, for example, based on a GNSS module in the external computer system 135. The user location may be determined, for example, based on cell tower triangulation technology (or other mobile phone tracking methods). The user location may be determined based on wireless connections (e.g., 802.11 connections) maintained by the external computer system 135. The user assistant platform 105 may, for example, authenticate the user and/or determine that a location of the user corresponds to the location of the enterprise organization if the user connects, using the external computer system 135, to a WLAN network (e.g., an 802.11 network) servicing the location of the enterprise organization.

At step 228, the user assistant platform 105 may retrieve at least a portion of the stored source data (e.g., as stored at step 208). The user assistant platform 105, for example, may retrieve at least a portion of the stored source data from the first look-up table, based on (e.g., in response to) authenticating the user and/or determining that a location of the user corresponds to the location of the enterprise organization.

At step 232, the user assistant platform 105 may transmit a notification message to an enterprise computer device (e.g., the enterprise user computing device 115). The notification message may comprise, for example, at least the portion of the retrieved source data (e.g., as retrieved in step 228). The enterprise user computing device 115 may correspond to, for example, an employee of the enterprise organization (e.g., as determined in the assistance information determined at step 212 and transmitted at step 216). The user assistant platform 105 may further transmit an indication, to the enterprise user computing device 115, that the user is now present at the location of the enterprise organization. The user assistant platform 105 may transmit at least the portion of the retrieved source data to the enterprise user computing device 115 based on identifying and/or authenticating the presence of the user at the location of the enterprise organization.

In an aspect, the user assistant platform 105 may transmit at least a portion of the received source data (e.g., as in step 204) to the enterprise user computing device 115 without authenticating the user and/or determining a location of the user. For example, the user assistant platform 105 may transmit the at least a portion of the received source data to the enterprise user computing device 115 immediately after step 204.

In an aspect, one or more of the steps described with reference to FIGS. 2A and 2B may be, for example, omitted. In an aspect, for example, the user assistant platform 105 may not receive a request for information and/or a request for a service from the external computer system 135, and may not transmit assistance information to the external computer system 135. The user assistant platform may, for example, authenticate a user (e.g., an external user) and/or determine that a location of the user corresponds to a location of the enterprise organization, retrieve source data from other communication devices in the computing environment 100 (e.g., from the user assistant platform 105, the enterprise application host platform 110, and/or the administrative computing device 120), and transmit the source data, in a notification message, to the enterprise user communication device 115. One or more additional steps (e.g., for determining source data, for authentication/identification may be added to the steps described with reference to FIGS. 2A and 2B.

In one or more aspects, the external computer system 135 may determine that a location of the external computer system 135 corresponds to a location of the enterprise organization. The external computer system 135 executes (e.g., starts) the application 140, for example, based on the determination that the location of the external computer system 135 corresponds to a location of the enterprise organization.

In one or more aspects, the external computer system 135 may transmit user activity history (e.g., within the application 140) and transmits the user activity history to the user assistant platform 105 (e.g., in the source data at step 204). The user activity history may correspond to a search history, account/profile edits, etc. The user activity history may, for example, correspond to user activity prior to the determination that the location of the user corresponds to a location of the enterprise organization.

In one or more aspects, the application 140 may be a smart assistant application that may perform, in association with one or more devices connected to the private network 155, certain services (e.g., associated with a request for service and/or a request for information) autonomously. The application 140 may, in one or more aspects, not transmit the source data to an enterprise computer device (e.g., the enterprise user computing device 115), for example, if the application 140, in association with one or more devices connected to the private network 155, is able to autonomously service a request from the external computer system 135. In one or more aspects, the user assistant platform 105 may only transmit one or more of the assistance information (e.g., as in step 218) and the notification message (e.g., as in the step 232) if the application 140 is unable to autonomously service a request from the external computer system 135. In one or more aspects, the user assistant platform 105 may transmit at least a portion of the received source data to the enterprise user computing device 115 immediately after step 204, if the application 140 is unable to autonomously service a request from the external computer system 135.

In one or more aspects, the user assistant platform 105 may aggregate assistance data provided to multiple users (e.g., external users). The user assistance platform 105 may transmit information corresponding to the collated assistance data to a user (e.g., an employee) corresponding to the enterprise organization. The aggregated data may be used, for example, to determine an estimate of a number of external users that may visit a particular location of the enterprise organization. The estimate of the number of external users may be determined, for example, based on assistance information provided by the user assistant platform 105.

One or more of the source data, the user information, the notification message, and/or other messages in the computing environment 100, and/or as described in the illustrative event sequence of FIGS. 2A and 2B may be transmitted and received using the 5G communication standards over wireless networks. One or more of the user assistant platform 105, the enterprise application host platform 110, the enterprise user computing device 115, the administrative computing device 120, the user interface terminal 127, the external computer system 135, and/or the sensor system(s) 125, 130, and/or 145, may use hardware and software that may implement the 5G communication standards. With reference to the user assistant platform 105, for example, the MAC processor(s) 108 may generate MPDUs (corresponding to one or more messages as described in the illustrative event sequence of FIGS. 2A and 2B) using the 5G communication standards, and the PHY processor(s) 109 may generate PPDUs (corresponding to one or more messages as described in the illustrative event sequence of FIGS. 2A and 2B) using the 5G communication standards, which may be then transmitted by the TX/RX module(s) 109-1 over a 5G wireless communication channel.

One or both of the assistance information and the notification message, for example, in a form of a push notification, an email message, a short messaging service (SMS) message, a multimedia messaging service (MMS) message, a message associated with the application 140 (for e.g., a message displayed in the application 140), and/or other visual alert(s) as indicated on the external computer system 135 and/or the enterprise user computing device 115. The assistance information may be, for example, an audio message as played on the external computer system 135.

5G standards allow a higher throughput than prior wireless cellular technologies that use $4^{th}$ generation (4G) standards, $3^{rd}$ generation (3G) standards, and the like. A higher throughput may allow a larger number of wireless devices (e.g., one or more of the external computer system 135, the sensor system(s) 130 and 145, etc.) to maintain communication over a wireless network. The use of 5G communication standards to maintain connections with communication devices (e.g., employee/external user devices) and sensor system(s) for authentication/identification may allow quick processing of user information and retrieval of data for better services. The higher throughput may, for example, allow interfacing a large number of sensor system(s) and use aggregated data from the sensor system(s). Availability of a larger data set may improve authentication systems (e.g., reducing the possibilities of false negatives) associated with a user.

Figure 3:
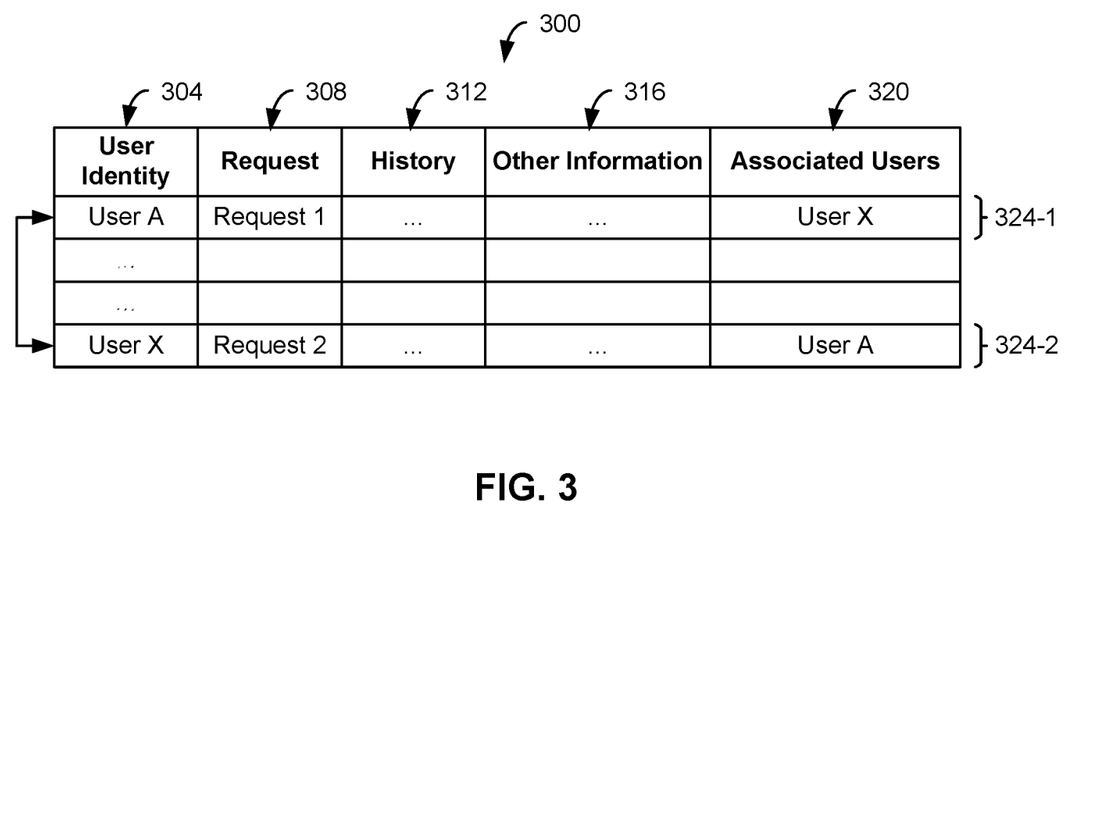
FIG. 3 shows an example look-up table for use in providing notifications, in accordance with one or more example embodiments.

FIG. 3 shows an example look-up table 300 for use in providing notification messages, in accordance with one or more example embodiments. The look-up table 300 is stored, for example, in the user assistant database 107-2 in the user assistant platform 105. The look-up table 300 may be populated using source data as obtained from one or more devices connected to the computing network 100. The look-up table 300 may, for example, correspond to a request for information and/or a request for a service, from an enterprise organization operating the user assistant platform 105, as obtained from the external computer system 135 (e.g., at the step 204). The look-up table 300 may further comprise other source data as obtained at step 204.

User identity field 304 may store identification information corresponding to a user (e.g., an external user) corresponding to the enterprise organization. The request field 308 may store the request for information and/or the request for the service as obtained from the external computer system 135 corresponding to the user identified in the user identity field 304. The history field 312 may store historical information corresponding to a profile/account of the user as identified in the user identity field 304. The history field 312 may store, for example, historical activity/transaction information corresponding to the user. The history field 312 may store, for example, user activity history (e.g., within the application 140). The other information field 316 may correspond to other profile information corresponding to the user identified in the user identity field 304. The other information field 316 may comprise other information corresponding to relationship between the enterprise organization and the user, user account information, services provided to the user, etc. The other information field 316 may comprise information corresponding to other services that may be available for access by the user.

The associated users field 320 may be used to link other users (e.g., other associated external users such family members, associates) corresponding to the user identified in the user identity field 304. Retrieving source data corresponding to the user (e.g., at step 228) may further comprise retrieving data corresponding to other associated users as identified in the associated users field 304. User A, for example, lists users X and Y as associated users, user X lists user A as an associated user, and user Y lists no one as an associated user. If user A requests information and/or a service from the enterprise organization operating the user assistant platform 105, retrieving the source data (e.g., at step 228) may comprise retrieving source data 324-1 corresponding to user A and source data 324-2 corresponding to user X.

Figure 4:
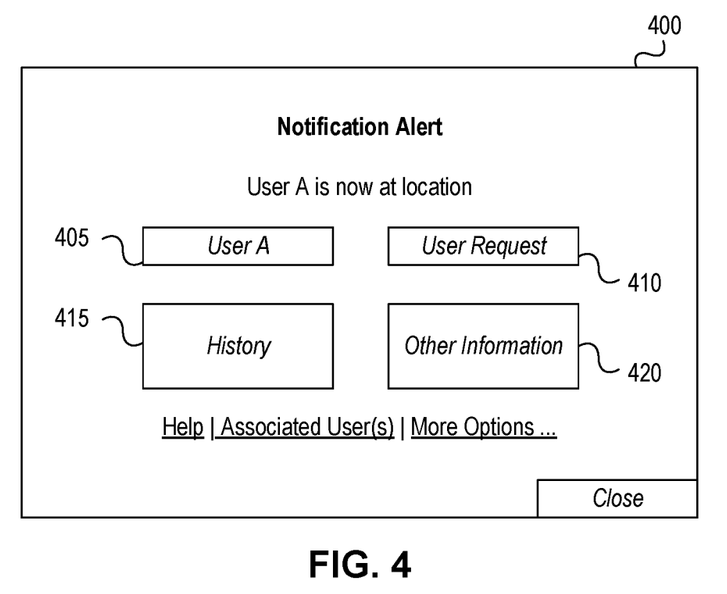
FIG. 4 shows an example graphical user interface corresponding to a notification, in accordance with one or more example embodiments.

FIG. 4 shows an example graphical user interface 400 corresponding to a notification message (e.g., as transmitted to an enterprise user computing device) in accordance with one or more example embodiments. In an example, the graphical user interface 400 is presented at the enterprise user computing device 115. The graphical user interface 400 may be presented at the enterprise user computing device 115, for example, if the enterprise user computing device 115 receives a notification message (e.g., the notification message as described above with reference to step 232) from the user assistant platform 105. The graphical user interface 400 may be presented in, for example, other enterprise devices as described above with reference the computing environment 100.

The graphical user interface 400 may display information, for example, as retrieved from the look-up table 300 stored in the user assistant database 107-2. The graphical user interface 400 may display, for example, user identity 400, user request 410 (e.g., a request for information and/or a request for a service), a user history 415, other information 420, etc. The graphical user interface 400 may also enable an employee operating the enterprise user computing device 115 to access information corresponding to any associated users. The various fields as illustrated in the graphical user interface 400 may correspond to various fields as described above with reference to FIG. 3.

Figure 5:
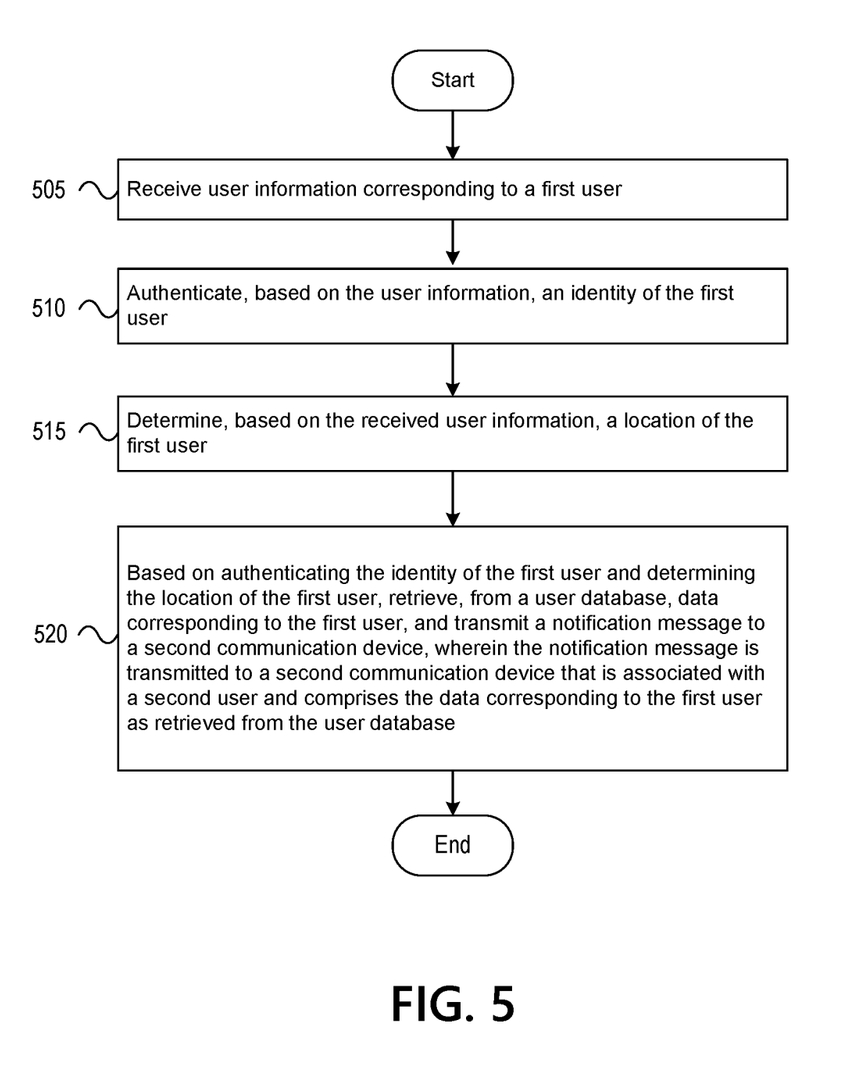
FIG. 5 shows an illustrative method for reception of user information, authentication of user information, and transmission of notifications, in accordance with one or more example embodiments.

FIG. 5 shows an illustrative method for reception of user information, authentication of user information, and transmission of notification messages, in accordance with one or more example embodiments. Referring to FIG. 5, at step 505, a computing platform comprising at least one processor, a communication interface, and memory may receive, via the communication interface, user information corresponding to a first user. The user information may be received, for example, from one or more sensors (e.g., the sensor system(s) 125, 130, and/or 145). The user information may correspond to biometric data. The user information may be location information received from a first communication device (e.g., the user terminal 127, the external computer system 135, etc.). The user information may be authentication information corresponding to the first user. The computing platform may utilize one or more techniques described above with reference to step 220 in FIG. 2B to receive user information corresponding to the first user.

At step 510, the computing platform may authenticate, based on the user information, an identity of the first user. The computing platform may authenticate the identity of the first user by, for example, by comparing the received authentication information with stored authentication information in an authentication database associated with the computing platform.

At step 515, the computing platform may determine a location of the first user. The computing platform may, for example, determine that the location of the first user corresponds to a location of the enterprise organization operating the computing platform. The computing platform may utilize the received authentication information in conjunction with the location information to determine the location of the first user. The computing platform may utilize one or more techniques described above with reference to step 224 in FIG. 2B to authenticate an identity of the first user and/or determine the location corresponding to the first user.

At step 520, the computing platform may, based on (i) authenticating the identity of the first user, and (ii) determining the location of the first user, retrieve, from a user database, data corresponding to the first user. The computing platform may further transmit, via the communication interface, a notification message to a second communication device. The notification message may be transmitted to a second communication device (e.g., the enterprise user computing device 115) that is associated with a second user, and may comprise the data corresponding to the first user as retrieved from the user database. The computing platform may utilize one or more techniques described above with reference to step 228 and step 232 in FIG. 2B to retrieve the data corresponding to the first user, and transmit the notification message. In various embodiments, the computing platform may correspond to the user assistant platform 105 described above with reference to FIGS. 1A, 1B, 2A, 2B, and 3 or any other device that performs functions corresponding to FIG. 5.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface and from a first communication device associated with a first user, source data; store the source data in a user database; link the source data to the first user;
   determine, based on the source data, assistance information, wherein the assistance information comprises an indication of a location obtained from a Global Navigation Satellite System (GNSS);
   transmit, via the communication interface and to a second communication device associated with the first user, the assistance information;
   receive, via the communication interface, user information corresponding to the first user, wherein:

receiving the user information comprises receiving the user information from at least one of: one or more biometric sensors and the second communication device associated with the first user, and the user information comprises: received authentication information corresponding to the first user and location information of the first user;

based on the received user information,
authenticate an identity of the first user, wherein authenticating the identity of the first user comprises comparing the received authentication information with stored authentication information stored in an authentication database associated with the computing platform, and
determine that a location of the first user corresponds to the location indicated in the assistance information; and based on authenticating the identity of the first user and determining that the location of the first user corresponds to the location indicated in the assistance information:
retrieve, from the user database, at least a portion of the source data corresponding to the first user, and
transmit, via the communication interface, a notification message to a third communication device associated with a second user, wherein the notification message comprises at least the portion of the source data corresponding to the first user as retrieved from the user database.

2. The computing platform of claim 1, wherein the received authentication information comprises biometric identification information corresponding to the first user and is received from the one or more biometric sensors, wherein the one or more biometric sensors are at the location indicated in the assistance information.

3. The computing platform of claim 1, wherein the received authentication information comprises biometric identification information corresponding to the first user and is received from the one or more biometric sensors, wherein the one or more biometric sensors are associated with the second communication device.

4. The computing platform of claim 1, wherein the location information of the first user corresponds to a location of the second communication device associated with the first user.

5. The computing platform of claim 1, where the second communication device is the same as the first communication device.

6. The computing platform of claim 1, wherein the source data corresponds to data as input by the first user at a user interface corresponding to the first communication device.

7. The computing platform of claim 1, wherein the assistance information comprises information corresponding to the second user associated with the third communication device.

8. The computing platform of claim 1, wherein:
receiving the source data comprises parsing keywords from the source data; and
determining the assistance information comprises determining the assistance information based on the parsed keywords.

9. The computing platform of claim 1, wherein the user information comprises a location as determined by the second communication device.

10. The computing platform of claim 1, wherein the notification message further comprises data corresponding to a second user associated with the first user.

11. The computing platform of claim 1, wherein the notification message further comprises data corresponding to historical activity at the second communication device.

12. A method, at a computing platform comprising at least one processor, a communication interface, and memory, the method comprising:
receiving, via the communication interface and from a first communication device associated with a first user, source data; storing the source data in a user database; linking the source data to the first user;
determining, based on the source data, assistance information, wherein the assistance information comprises an indication of a location obtained from a Global Navigation Satellite System (GNSS);
transmitting, via the communication interface and to a second communication device associated with the first user, the assistance information;
receiving, via the communication interface, user information corresponding to the first user, wherein:
receiving the user information comprises receiving the user information, from at least one of one or more biometric sensors and the second communication device associated with the first user, and the user information comprises: received authentication information corresponding to the first user and location information of the first user;
based on the received user information,
authenticating an identity of the first user, wherein authenticating the identity of the first user comprises comparing the received authentication information with stored authentication information stored in an authentication database associated with the computing platform, and
determining that a location of the first user corresponds to the location indicated in the assistance information; and
based on authenticating the identity of the first user and determining that the location of the first user corresponds to the location indicated in the assistance information:
retrieving, from the user database, at least a portion of the source data corresponding to the first user, and
transmitting, via the communication interface, a notification message to a third communication device that is associated with a second user, wherein the notification message comprises at least the portion of the source data corresponding to the first user as retrieved from the user database.

13. The method of claim 12, wherein the received authentication information comprises biometric identification information corresponding to the first user and is received from the one or more biometric sensors, wherein the one or more biometric sensors are at the location indicated in the assistance information.

14. The method of claim 12, wherein the location information of the first user corresponds to a location of the second communication device associated with the first user.

15. The method of claim 12, further comprising:
storing the source data in the user database; and
linking the source data to the first user, wherein retrieving the data corresponding to the first user from the user database comprises retrieving the source data linked to the first user.

16. The method of claim 12, wherein the notification message further comprises data corresponding to a second user associated with the first user.

17. One or more non-transitory computer-readable media storing instructions that, when executed by a computing platform comprising at least one processor, a communication interface, and memory, cause the computing platform to:
  receive, via the communication interface and from a first communication device associated with a first user, source data; store the source data in a user database; link the source data to the first user;
  determine, based on the source data, assistance information, wherein the assistance information comprises an indication of a location obtained from a Global Navigation Satellite System (GNSS);
  transmit, via the communication interface and to a second communication device associated with the first user, the assistance information;
  receive, via the communication interface, user information corresponding to a first user, wherein:
    receiving the user information comprises receiving the user information, from at least one of one or more biometric sensors and the second communication device associated with the first user, and the user information comprises: received authentication information corresponding to the first user and location information of the first user;
  based on the received user information,
    authenticate an identity of the first user, wherein authenticating the identity of the first user comprises comparing the received authentication information with stored authentication information stored in an authentication database associated with the computing platform, and
    determine that a location of the first user corresponds to the location indicated in the assistance information; and
  based on authenticating the identity of the first user and determining that the location of the first user corresponds to the location indicated in the assistance information:
    retrieve, from the user database, at least a portion of the source data corresponding to the first user, and
    transmit, via the communication interface, a notification message to a third communication device that is associated with a second user, wherein the notification message comprises at least a portion of the source data corresponding to the first user as retrieved from the user database.

* * * * *

UNITED STATES PATENT AND TRADEMARK OFFICE
CERTIFICATE OF CORRECTION

| | |
|---|---|
| PATENT NO. | : 11,418,503 B2 |
| APPLICATION NO. | : 16/503114 |
| DATED | : August 16, 2022 |
| INVENTOR(S) | : Gottumukkala et al. |

It is certified that error appears in the above-identified patent and that said Letters Patent is hereby corrected as shown below:

In the Claims

Column 20, Claim 17, Line 21:
Delete "a" and insert --the-- therefor

Signed and Sealed this
Second Day of January, 2024

Katherine Kelly Vidal
*Director of the United States Patent and Trademark Office*